(12) United States Patent
Akitt

(10) Patent No.: US 8,624,835 B2
(45) Date of Patent: Jan. 7, 2014

(54) INTERACTIVE INPUT SYSTEM AND ILLUMINATION SYSTEM THEREFOR

(75) Inventor: Trevor Mitchell Akitt, Calgary (CA)

(73) Assignee: SMART Technologies ULC (CA)

( * ) Notice: Subject to any disclaimer, the term of this patent is extended or adjusted under 35 U.S.C. 154(b) by 485 days.

(21) Appl. No.: 12/709,451

(22) Filed: Feb. 19, 2010

(65) Prior Publication Data
US 2011/0169727 A1 Jul. 14, 2011

Related U.S. Application Data

(60) Provisional application No. 61/294,825, filed on Jan. 13, 2010.

(51) Int. Cl.
*H04N 9/68* (2006.01)
(52) U.S. Cl.
USPC ........... 345/156; 345/173; 345/175; 345/157; 345/179; 250/221; 702/153; 178/18.09; 178/19.05
(58) Field of Classification Search
USPC .......................... 345/156–157, 173–179, 221; 178/18.01–18.09, 19.05; 257/98; 250/221; 702/153
See application file for complete search history.

(56) References Cited

U.S. PATENT DOCUMENTS

| | | | |
|---|---|---|---|
| 5,448,263 A | 9/1995 | Martin | |
| 6,141,000 A | 10/2000 | Martin | |
| 6,337,681 B1 | 1/2002 | Martin | |
| 6,747,636 B2 | 6/2004 | Martin | |
| 6,803,906 B1 | 10/2004 | Morrison et al. | |
| 6,972,401 B2 | 12/2005 | Akitt et al. | |
| 7,202,860 B2 | 4/2007 | Ogawa | |
| 7,232,986 B2 | 6/2007 | Worthington et al. | |
| 7,236,162 B2 | 6/2007 | Morrison et al. | |
| 7,274,356 B2 | 9/2007 | Ung et al. | |
| 7,532,206 B2 | 5/2009 | Morrison et al. | |
| 2005/0178953 A1* | 8/2005 | Worthington et al. | 250/221 |
| 2009/0213093 A1* | 8/2009 | Bridger | 345/175 |
| 2009/0277694 A1 | 11/2009 | Hansen et al. | |
| 2010/0097353 A1* | 4/2010 | Newton | 345/175 |
| 2010/0103143 A1* | 4/2010 | Newton et al. | 345/175 |

FOREIGN PATENT DOCUMENTS

WO 2004/042648 A2 5/2004
WO 2009/135313 A1 11/2009

OTHER PUBLICATIONS

U.S. Appl. No. 61/294,831, entitled "Interactive Input System and Tool Tray Therefor", filed Jan. 13, 2010.
U.S. Appl. No. 61/294,827, entitled "Housing Assembly for Interactive Input System and Fabrication Method", filed Jan. 13, 2010.
U.S. Appl. No. 61/294,832, entitled "Interactive Input System and Illumination System Therefor", filed Jan. 14, 2010.
Transmittal; Written Opinion of the International Searching Authority; and the International Search Report for international Application No. PCT/CA2011/000037, with a mailing date of.

* cited by examiner

*Primary Examiner* — Lun-Yi Lao
*Assistant Examiner* — MD Saiful A Siddiqui
(74) *Attorney, Agent, or Firm* — Katten Muchin Rosenman LLP

(57) ABSTRACT

An interactive input system includes at least one illumination source emitting radiation into a region of interest; at least one imaging assembly capturing image frames of the region of interest, the at least one illumination source being in the field of view of the at least one imaging assembly; and a controller communicating with the at least one illumination source, the controller controlling the intensity of radiation emitted by the at least one illumination source during image frame capture.

24 Claims, 8 Drawing Sheets

INTERACTIVE INPUT SYSTEM AND ILLUMINATION SYSTEM THEREFOR

CROSS REFERENCE TO RELATED APPLICATIONS

This application claims the benefit of U.S. Provisional Application No. 61/294,825 to Akitt filed on Jan. 13, 2010, entitled "INTERACTIVE INPUT SYSTEM AND ILLUMINATION SYSTEM THEREFOR", the content of which is incorporated herein by reference in its entirety.

FIELD OF THE INVENTION

The present invention relates to an interactive input system and to an illumination method therefor.

BACKGROUND OF THE INVENTION

Interactive input systems that allow users to inject input (e.g. digital ink, mouse events, etc.) into an application program using an active pointer (e.g., a pointer that emits light, sound or other signal), a passive pointer (e.g., a finger, cylinder or other object) or other suitable input device such as for example, a mouse or trackball, are well known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; 7,274,356; and 7,532,206 assigned to SMART Technologies ULC of Calgary, Alberta, Canada, assignee of the subject application, the contents of which are incorporated by reference in their entirety; touch systems comprising touch panels employing electromagnetic, capacitive, acoustic or other technologies to register pointer input; tablet personal computers (PCs); laptop PCs; personal digital assistants (PDAs); and other similar devices.

Above-incorporated U.S. Pat. No. 6,803,906 to Morrison, et al., discloses a touch system that employs machine vision to detect pointer interaction with a touch surface on which a computer-generated image is presented. A rectangular bezel or frame surrounds the touch surface and supports digital imaging devices at its corners. The digital imaging devices have overlapping fields of view that encompass and look generally across the touch surface. The digital imaging devices acquire images looking across the touch surface from different vantages and generate image data. Image data acquired by the digital imaging devices is processed by on-board digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y) coordinates relative to the touch surface using triangulation. The pointer coordinates are conveyed to a computer executing one or more application programs. The computer uses the pointer coordinates to update the computer-generated image that is presented on the touch surface. Pointer contacts on the touch surface can therefore be recorded as writing or drawing or used to control execution of application programs executed by the computer.

U.S. Pat. No. 6,972,401 to Akitt, et al., assigned to SMART Technologies ULC, the content of which is incorporated herein by reference in its entirety, discloses an illuminated bezel for use in a touch system such as that disclosed in above-incorporated U.S. Pat. No. 6,803,906. The illuminated bezel comprises infrared (IR) light emitting diodes (LEDs) that project infrared light onto diffusers. The diffusers in turn, diffuse the infrared light so that the intensity of backlighting provided over the touch surface by the illuminated bezel is generally even across the surfaces of the diffusers. As a result, the backlight illumination provided by the bezel appears generally continuous to the digital cameras. Although this illuminated bezel works very well, it adds cost to the touch system.

U.S. Pat. No. 7,202,860 to Ogawa discloses a camera-based coordinate input device that allows coordinate input using a pointer or finger. The coordinate input device comprises a pair of cameras positioned in the upper left and upper right corners of a display screen. The field of view of each camera extends to a diagonally opposite corner of the display screen in parallel with the display screen. Infrared light emitting diodes are arranged close to the imaging lens of each camera and illuminate the surrounding area of the display screen. An outline frame or bezel is provided on three sides of the display screen. A narrow-width retro-reflection tape is arranged near the display screen on the outline frame. A non-reflective reflective black tape is attached to the outline frame along and in contact with the retro-reflection tape. The retro-reflection tape reflects the light from the infrared light emitting diodes allowing the reflected light to be picked up by the cameras as a strong white signal. When a user's finger is placed proximate to the display screen, the finger appears as a shadow over the image of the retro-reflection tape.

U.S. Patent Application Publication No. 2009/0277694 to Hansen, et al., assigned to SMART Technologies ULC, the content of which is incorporated herein by reference in its entirety, discloses an interactive input system comprising a bezel surrounding a region of interest. The bezel has a plurality of adjacent bands with different optical properties, typically at least an IR light absorbing band and an IR retro-reflecting band. Imaging devices look into the region of interest from different vantages and capture images. IR light sources located near the imaging devices provide illumination to the bezel. The IR absorbing bands appear dark to the imaging devices whereas the IR retro-reflecting bands appear bright to the imaging devices. When a pointer is positioned in the region of interest, the pointer appears as a dark region interrupting a generally continuous bright band corresponding to the IR retro-reflecting material. To reduce the effects of unwanted light, the discontinuity of light over both the IR absorbing and the IR retro-reflecting bands is measured to detect the existence of a pointer.

Although the above interactive input systems that employ retro-reflecting material work well, problems are encountered when the field of view of one or both of the imaging devices sees the other imaging device and/or its proximate IR light source. This issue worsens when additional imaging devices are employed. As will be appreciated, as additional imaging devices are added, the probability that imaging devices and IR light sources will be within the fields of view of other imaging devices increases. Since the imaging devices appear as dark discontinuities along otherwise bright bands corresponding to the retro-reflective material, a possibility exists that imaging devices may falsely be detected as pointers. Additionally, IR light sources directly visible to an imaging device will saturate pixel values and cause 'blooming' where the values of adjacent pixels will become corrupt. If a pointer happens to move into the field of view of an imaging device across a corrupted region of pixels, the corrupted region of pixels may deform the shape of the pointer causing inaccuracies. As will be appreciated, improvements are desired.

It is therefore an object of the present invention to provide a novel interactive input system and illumination method therefor.

SUMMARY OF THE INVENTION

Accordingly, in one aspect there is provided an interactive input system comprising at least one illumination source emitting radiation into a region of interest; at least one imaging assembly capturing image frames of said region of interest, said at least one illumination source being in the field of view of said at least one imaging assembly; and a controller communicating with said at least one illumination source, said controller controlling the intensity of radiation emitted by said at least one illumination source during image frame capture.

In one embodiment, the intensity of radiation emitted by the at least one illumination source during image frame capture is reduced to a level approximating the background in image frames captured by the at least one imaging device. The interactive input system in one form comprises a plurality of imaging assemblies capturing images of the region of interest from different vantages, at least one illumination source adjacent each imaging assembly and a controller for each illumination source. The controller is responsive to its associated imaging assembly during image frame capture thereby to illuminate generally fully the associated illumination source and is responsive to its associated imaging assembly during image frame capture by other imaging assemblies to illuminate the associated illumination source at a reduced level.

In one embodiment, the region of interest is generally rectangular, imaging assemblies are positioned adjacent at least two corners of said region of interest, and an illumination source is positioned adjacent each imaging assembly. A retro-reflective bezel surrounds the region of interest.

According to another aspect there is provided a method of controlling image capture in an interactive input system, the method comprising causing at least one illumination source to emit radiation into a region of interest; causing at least one imaging assembly to capture image frames of said region of interest, said at least one illumination source being in the field of view of said at least one imaging assembly; and controlling the intensity of radiation emitted by said at least one illumination source during image frame capture.

BRIEF DESCRIPTION OF THE DRAWINGS

Embodiments will now be described more fully with reference to the accompanying drawings in which.

DETAILED DESCRIPTION OF THE EMBODIMENTS

Figure 1:
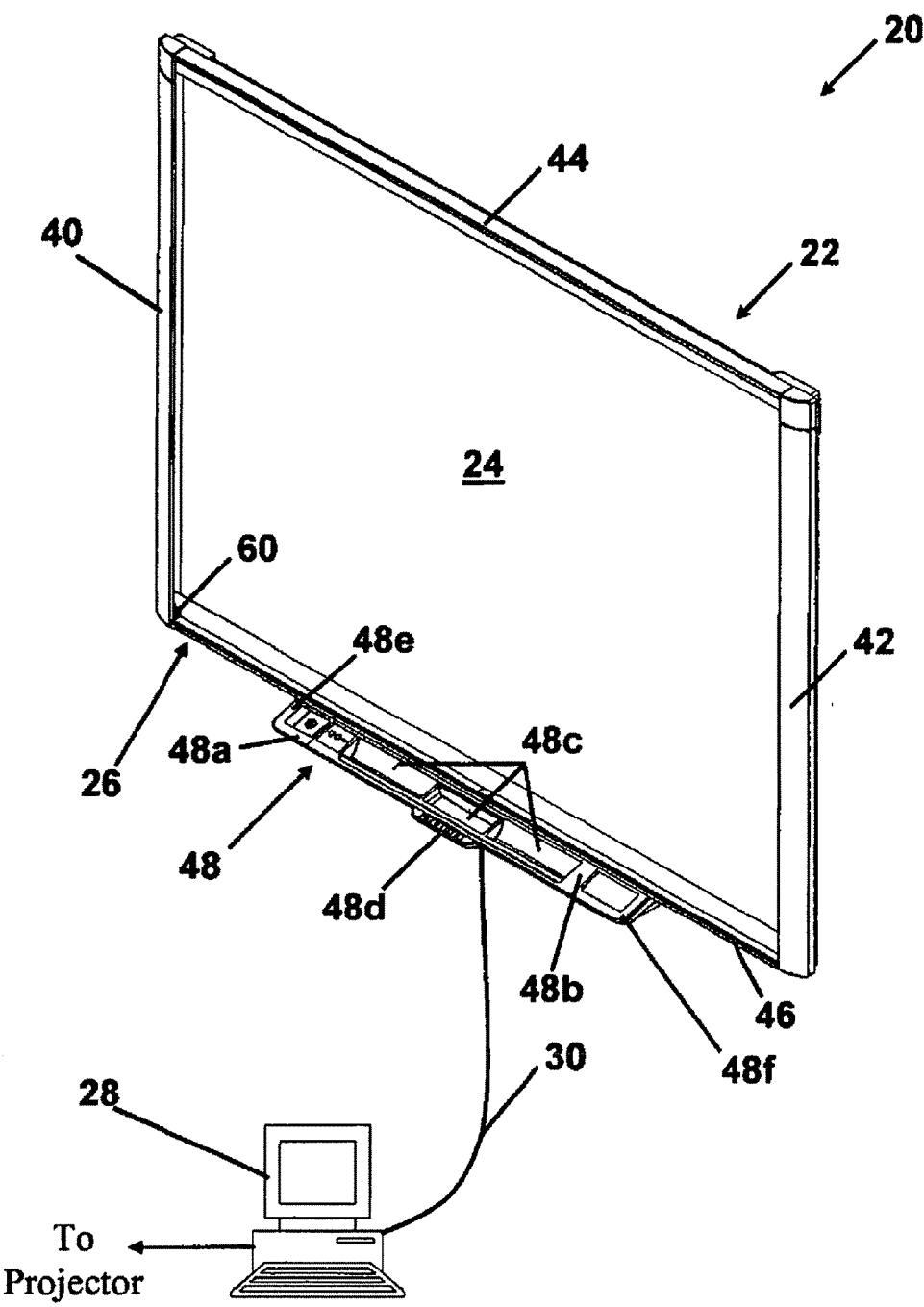
FIG. 1 is a schematic, partial perspective view of an interactive input system.
Figure 2:
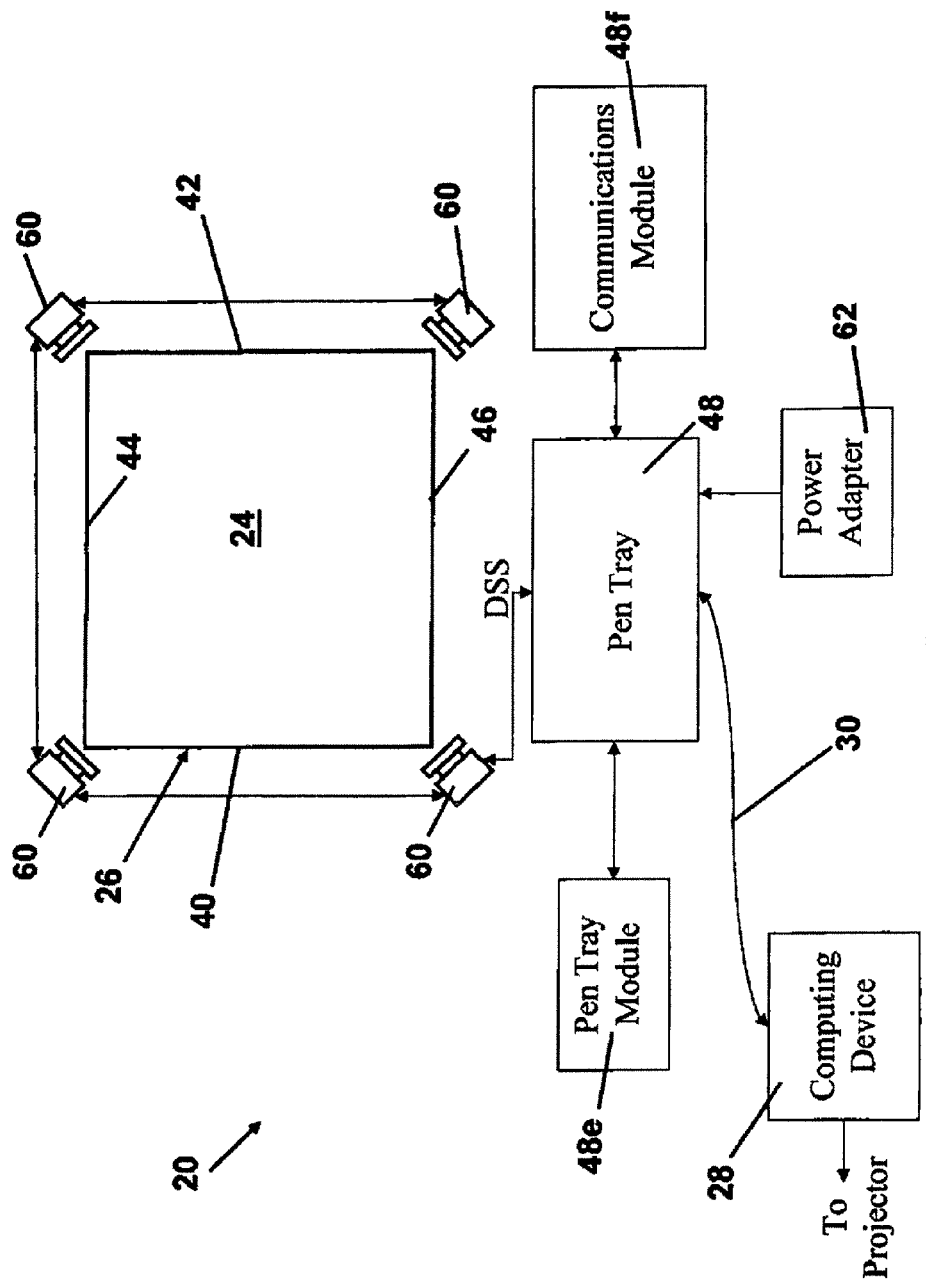
FIG. 2 is a block diagram of the interactive input system of FIG. 1.

Turning now to FIGS. 1 and 2, an interactive input system that allows a user to inject input such as digital ink, mouse events etc. into an application program executed by a computing device is shown and is generally identified by reference numeral 20. In this embodiment, interactive input system 20 comprises an interactive board 22 mounted on a vertical support surface such as for example, a wall surface or the like. Interactive board 22 comprises a generally planar, rectangular interactive surface 24 that is surrounded about its periphery by a bezel 26. An ultra-short throw projector (not shown) such as that sold by SMART Technologies ULC under the name Miata™ is also mounted on the support surface above the interactive board 22 and projects an image, such as for example a computer desktop, onto the interactive surface 24.

The interactive board 22 employs machine vision to detect one or more pointers brought into a region of interest in proximity with the interactive surface 24. The interactive board 22 communicates with a general purpose computing device 28 executing one or more application programs via a universal serial bus (USB) cable 30. General purpose computing device 28 processes the output of the interactive board 22 and adjusts image data that is output to the projector, if required, so that the image presented on the interactive surface 24 reflects pointer activity. In this manner, the interactive board 22, general purpose computing device 28 and projector allow pointer activity proximate to the interactive surface 24 to be recorded as writing or drawing or used to control execution of one or more application programs executed by the general purpose computing device 28.

The bezel 26 in this embodiment is mechanically fastened to the interactive surface 24 and comprises four bezel segments 40, 42, 44, 46. Bezel segments 40 and 42 extend along opposite side edges of the interactive surface 24 while bezel segments 44 and 46 extend along the top and bottom edges of the interactive surface 24 respectively. In this embodiment, the inwardly facing surface of each bezel segment 40, 42, 44 and 46 comprises a single, longitudinally extending strip or band of retro-reflective material. To take best advantage of the properties of the retro-reflective material, the bezel segments 40, 42, 44 and 46 are oriented so that their inwardly facing surfaces extend in a plane generally normal to the plane of the interactive surface 24.

A tool tray 48 is affixed to the interactive board 22 adjacent the bezel segment 46 using suitable fasteners such as for example, screws, clips, adhesive etc. As can be seen, the tool tray 48 comprises a housing 48a having an upper surface 48b configured to define a plurality of receptacles or slots 48c. The receptacles are sized to receive one or more pen tools P and an eraser tool (not shown) that can be used to interact with the interactive surface 24. Control buttons 48d are provided on the upper surface 48b to enable a user to control operation of the interactive input system 20. One end of the tool tray 48 is configured to receive a detachable tool tray accessory module 48e while the opposite end of the tool tray 48 is configured to receive a detachable communications module 48f for remote device communications. The housing 48a accommodates a master controller 50 (see FIG. 6) as will be described. Further specifics of the tool tray 48 are described in U.S. Provisional Application Ser. No. 61/294,831 to Bolt, et al., entitled "INTERACTIVE INPUT SYSTEM AND TOOL TRAY THEREFOR" filed Jan. 13, 2010, the content of which is incorporated herein by reference in its entirety.

Imaging assemblies 60 are accommodated by the bezel 26, with each imaging assembly 60 being positioned adjacent a different corner of the bezel. The imaging assemblies 60 are oriented so that their fields of view overlap and look generally across the entire interactive surface 24. In this manner, any pointer such as for example a user's finger, a cylinder or other suitable object, or a pen or eraser tool lifted from a receptacle 48c of the tool tray 48, that is brought into proximity of the interactive surface 24 appears in the fields of view of the imaging assemblies 60. A power adapter 62 provides the necessary operating power to the interactive board 22 when connected to a conventional AC mains power supply.

Figure 3:
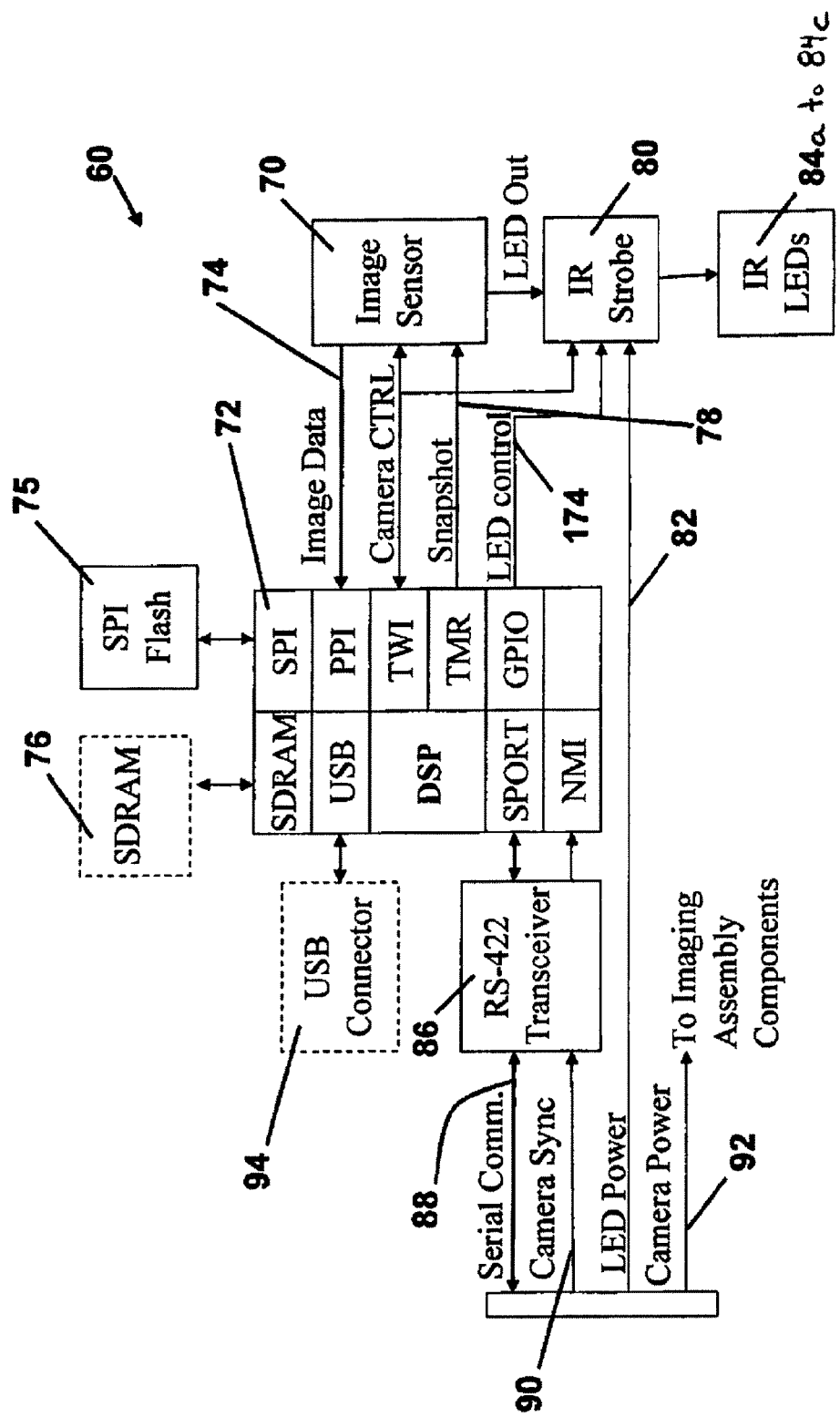
FIG. 3 is a block diagram of an imaging assembly forming part of the interactive input system of FIG. 1.

Turning now to FIG. 3, one of the imaging assemblies 60 is better illustrated. As can be seen, the imaging assembly 60 comprises an image sensor 70 such as that manufactured by Aptina (Micron) MT9V034 having a resolution of 752×480 pixels, fitted with a two element, plastic lens (not shown) that provides the image sensor 70 with a field of view of approximately 104 degrees. In this manner, the other imaging assemblies 60 are within the field of view of the image sensor 70 thereby to ensure that the field of view of the image sensor 70 encompasses the entire interactive surface 24.

A digital signal processor (DSP) 72 such as that manufactured by Analog Devices under part number ADSP-BF522 Blackfin or other suitable processing device, communicates with the image sensor 70 over an image data bus 74 via a parallel port interface (PPI). A serial peripheral interface (SPI) flash memory 74 is connected to the DSP 72 via an SPI port and stores the firmware required for image assembly operation. Depending on the size of captured image frames as well as the processing requirements of the DSP 72, the imaging assembly 60 may optionally comprise synchronous dynamic random access memory (SDRAM) 76 to store additional temporary data as shown by the dotted lines. The image sensor 70 also communicates with the DSP 72 via a two-wire interface (TWI) and a timer (TMR) interface. The control registers of the image sensor 70 are written from the DSP 72 via the TWI in order to configure parameters of the image sensor 70 such as the integration period for the image sensor 70.

In this embodiment, the image sensor 70 operates in snapshot mode. In the snapshot mode, the image sensor 70, in response to an external trigger signal received from the DSP 72 via the TMR interface that has a duration set by a timer on the DSP 72, enters an integration period during which an image frame is captured. Following the integration period after the generation of the trigger signal by the DSP 72 has ended, the image sensor 70 enters a readout period during which time the captured image frame is available. With the image sensor in the readout period, the DSP 72 reads the image frame data acquired by the image sensor 70 over the image data bus 74 via the PPI. The frame rate of the image sensor 70 in this embodiment is between about 900 and about 960 frames per second. The DSP 72 in turn processes image frames received from the image sensor 72 and provides pointer information to the master controller 50 at a reduced rate of approximately 120 points/sec. Those of skill in the art will however appreciate that other frame rates may be employed depending on the desired accuracy of pointer tracking and whether multi-touch and/or active pointer identification is employed.

Three strobe circuits 80 communicate with the DSP 72 via the TWI and via a general purpose input/output (GPIO) interface. The strobe circuits 80 also communicate with the image sensor 70 and receive power provided on LED power line 82 via the power adapter 62. Each strobe circuit 80 drives a respective illumination source in the form of infrared (IR) light emitting diodes (LEDs) 84a to 84c, that provides infrared backlighting over the interactive surface 24 as will be described.

The DSP 72 also communicates with an RS-422 transceiver 86 via a serial port (SPORT) and a non-maskable interrupt (NMI) port. The transceiver 86 communicates with the master controller 50 over a differential synchronous signal (DSS) communications link 88 and a synch line 90. Power for the components of the imaging assembly 60 is provided on power line 92 by the power adapter 52. DSP 72 may also optionally be connected to a USB connector 94 via a USB port as indicated by the dotted lines. The USB connector 94 can be used to connect the imaging assembly 60 to diagnostic equipment. Further, by using a similar architecture for each imaging assembly 60 and the master controller 50, the same circuit board assembly and common components may be used for both thus reducing the part count and cost of the interactive input system. Differing components are added to the circuit board assemblies during manufacture dependent upon whether the circuit board assembly is intended for use in an imaging assembly 60 or in the master controller 50. For example, the master controller 50 may require a SDRAM 76 whereas the imaging assembly 60 may not.

Figure 4A:
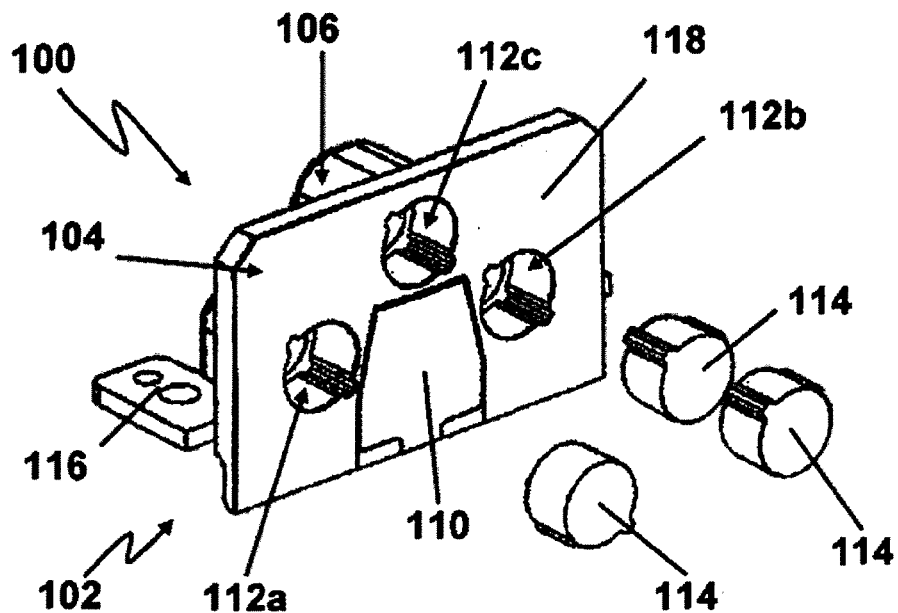
FIGS. 4a and 4b are front and rear perspective views of a housing assembly forming part of the imaging assembly of FIG. 3.
Figure 4B:
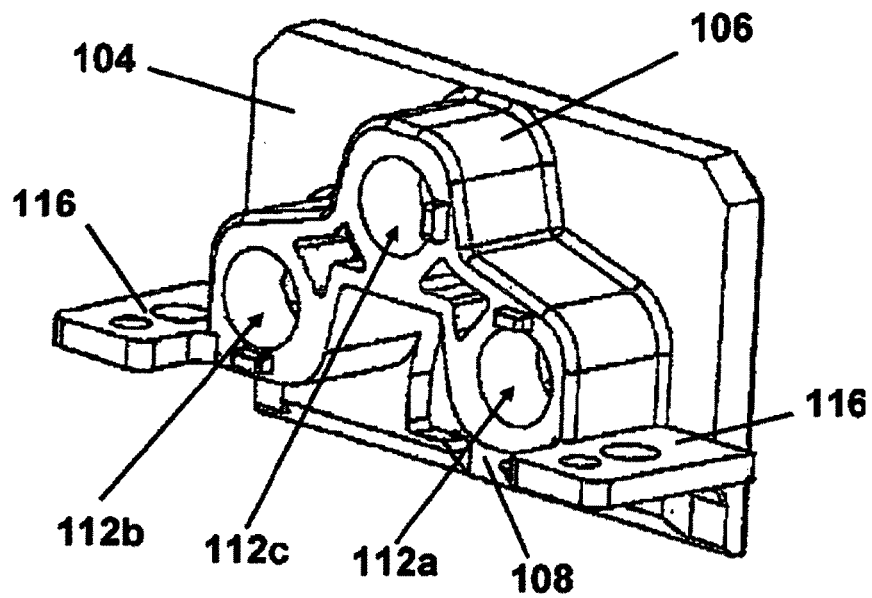

The image sensor 70 and its associated lens as well as the IR LEDs 84a to 84c are mounted on a housing assembly 100 that is best illustrated in FIGS. 4a and 4b. As can be seen, the housing assembly 100 comprises a polycarbonate housing body 102 having a front portion 104 and a rear portion 106 extending from the front portion. An imaging aperture 108 is centrally formed in the housing body 102 and accommodates an IR-pass/visible light blocking filter 110. The filter 110 has an IR-pass wavelength range of between about 830 nm and about 880 nm. The image sensor 70 and associated lens are positioned behind the filter 110 and oriented such that the field of view of the image sensor 70 looks through the filter 110 and generally across the interactive surface 24. The rear portion 106 is shaped to surround the image sensor 70. Three passages 112a to 112c are formed through the housing body 102. Passages 112a and 112b are positioned on opposite sides of the filter 110 and are in general horizontal alignment with the image sensor 70. Passage 112c is centrally positioned above the filter 110. Each tubular passage receives a light source socket 114 that is configured to receive a respective one of the IR LEDs 84. In particular, the socket 114 received in passage 112a accommodates IR LED 84a, the socket 114 received in passage 112b accommodates IR LED 84b, and the socket 114 received in passage 112c accommodates IR LED 84c. Mounting flanges 116 are provided on opposite sides of the rear portion 106 to facilitate connection of the housing assembly 100 to the bezel 26 via suitable fasteners. A label 118 formed of retro-reflective material overlies the front surface of the front portion 104. Further specifics concerning the housing assembly and its method of manufacture are described in U.S. Provisional Application Ser. No. 61/294,827 to Liu, et al., entitled "HOUSING ASSEMBLY FOR INTERACTIVE INPUT SYSTEM AND FABRICATION METHOD" filed on Jan. 13, 2010, the content of which is incorporated herein by reference in its entirety.

Figure 5:
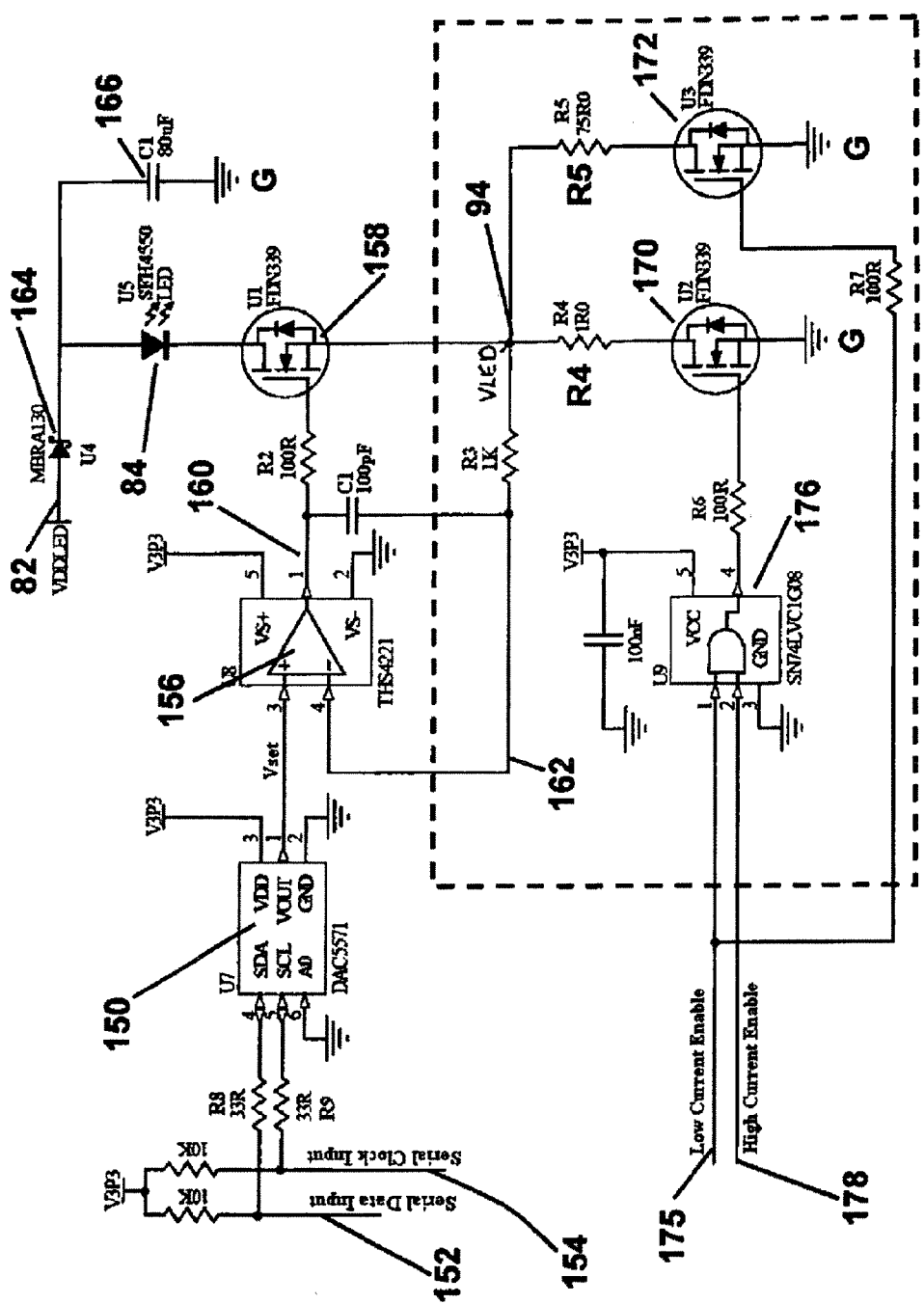
FIG. 5 is a circuit diagram of a strobe circuit forming part of the imaging assembly of FIG. 3.

FIG. 5 better illustrates a portion of one of the strobe circuits 80. As can be seen, the strobe circuit 80 comprises a digital-to-analog converter (DAC) 150 that receives serial data via input line 152 and resistor R8 and clock input via clock line 154 and resistor R9. The DAC 150 provides output to the non-inverting terminal of an operational amplifier 156, which in turn provides output to a first terminal of a transistor 158 via line 160 and resistor R2. A second terminal of the transistor 158 is connected to node VLED 94. The inverting terminal of the operational amplifier 156 is connected to the node VLED 94 via line 162 and resistor R3. Line 160 and line 162 are interconnected by capacitor C1. A third terminal of the transistor 158 is connected to the LED power line 82 via one of the IR LEDs 84 and via Schottky diode 164. A storage capacitor 166 is also connected between the Schottky diode 164 and ground G.

The node VLED 94 is also connected to a first terminal of a transistor 170 via resistor R4 and to a first terminal of a transistor 172 via resistor R5. A second terminal of transistor 172 is connected to ground G and a third terminal of transistor 172 is connected to a low current enable line 175 via resistor R7. A second terminal of transistor 170 is connected to ground G and a third terminal of the transistor 170 is connected to the output terminal of an AND gate 176 via resistor R6. One input terminal of the AND gate 176 is connected to the low current enable line 175 while the other input terminal of the AND gate 176 is connected to a high current enable line 178. Although not shown, those of skill in the art will appreciate that the strobe circuit comprises similar circuitry to drive the other two IR LEDs.

Figure 6:
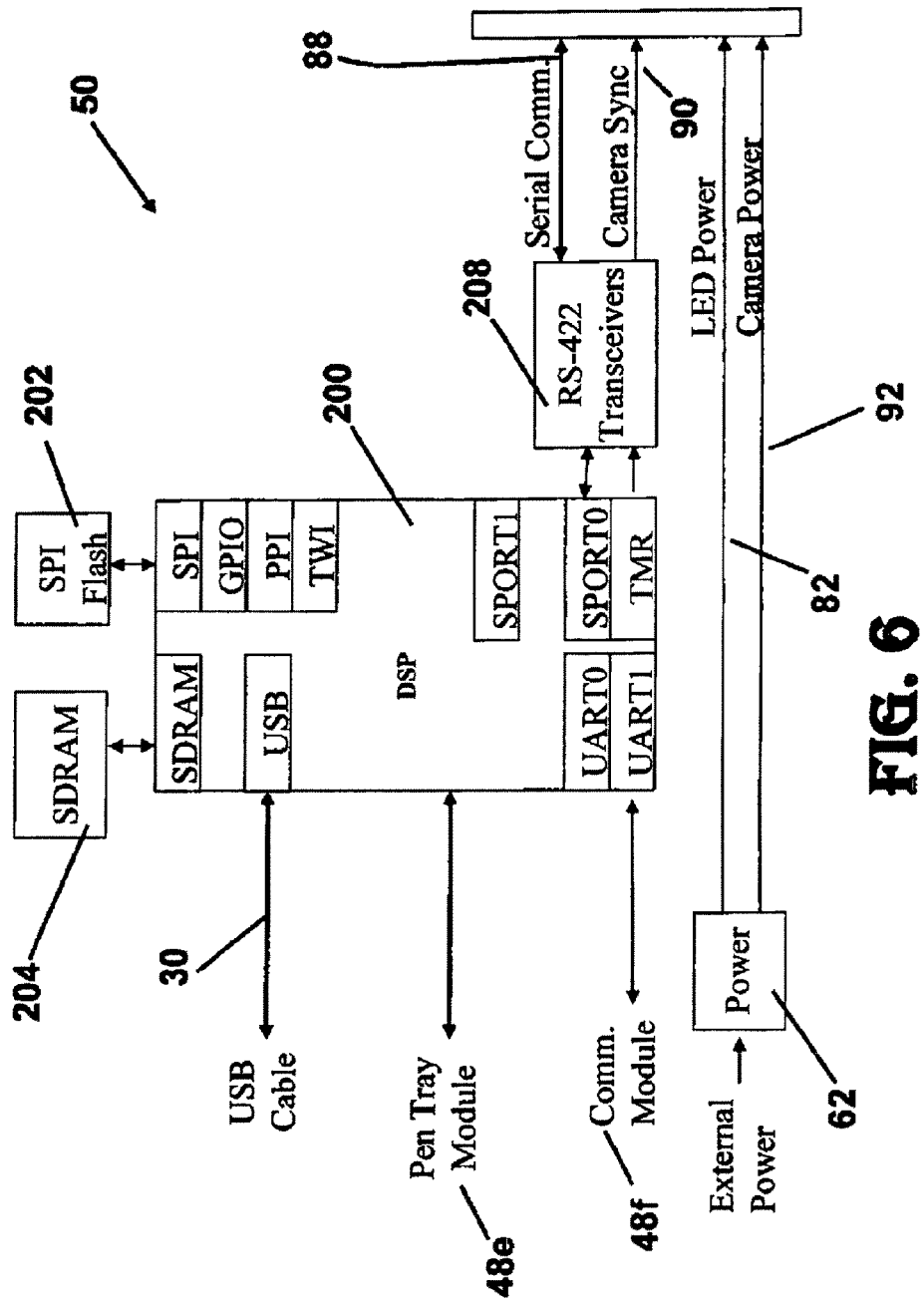
FIG. 6 is a block diagram of a master controller forming part of the interactive input system of FIG. 1.

The master controller 50 better is illustrated in FIG. 6. As can be seen, master controller 50 comprises a DSP 200 such as that manufactured by Analog Devices under part number ADSP-BF522 Blackfin or other suitable processing device. A serial peripheral interface (SPI) flash memory 202 is connected to the DSP 200 via an SPI port and stores the firmware required for master controller operation. A synchronous dynamic random access memory (SDRAM) 204 that stores temporary data necessary for system operation is connected to the DSP 200 via an SDRAM port. The DSP 200 communicates with the general purpose computing device 28 over the USB cable 30 via a USB port. The DSP 200 communicates through its serial port (SPORT) with the imaging assemblies 60 via an RS-422 transceiver 208 over the differential synchronous signal (DSS) communications link 88. In this embodiment, as more than one imaging assembly 60 communicates with the master controller DSP 200 over the DSS communications link 88, time division multiplexed (TDM) communications is employed. The DSP 200 also communicates with the imaging assemblies 60 via the RS-422 transceiver 208 over the camera synch line 90. DSP 200 communicates with the tool tray accessory module 48e over an inter-integrated circuit I²C channel and communicates with the communications accessory module 48f over universal asynchronous receiver/transmitter (UART), serial peripheral interface (SPI) and I²C channels.

The general purpose computing device 28 in this embodiment is a personal computer or other suitable processing device comprising, for example, a processing unit, system memory (volatile and/or non-volatile memory), other non-removable or removable memory (e.g., a hard disk drive, RAM, ROM, EEPROM, CD-ROM, DVD, flash memory, etc.) and a system bus coupling the various computer components to the processing unit. The computer may also comprise a network connection to access shared or remote drives, one or more networked computers, or other networked devices.

During operation, the DSP 200 of the master controller 50 outputs synchronization signals that are applied to the synch line 90 via the transceiver 208. Each synchronization signal applied to the synch line 90 is received by the DSP 72 of each imaging assembly 60 via transceiver 86 and triggers a non-maskable interrupt (NMI) on the DSP 72. In response to the non-maskable interrupt triggered by the synchronization signal, the DSP 72 of each imaging assembly 60 ensures that its local timers are within system tolerances and if not, corrects its local timers to match the master controller 50. Using one local timer, the DSP 72 initiates a pulse sequence via the snapshot line that is used to condition the image sensor to the snapshot mode and to control the integration period and frame rate of the image sensor 70 in the snapshot mode. The DSP 72 also initiates a second local timer that is used to provide output on the LED control line 174 so that the IR LEDs 84a to 84c are properly powered during the image frame capture cycle.

In response to the pulse sequence output on the snapshot line, the image sensor 70 of each imaging assembly 60 acquires image frames at the desired image frame rate. In this manner, image frames captured by the image sensor 70 of each imaging assembly can be referenced to the same point of time allowing the position of pointers brought into the fields of view of the image sensors 70 to be accurately triangulated. Also, by distributing the synchronization signals for the imaging assemblies 60, electromagnetic interference is minimized by reducing the need for transmitting a fast clock signal to each image assembly 60 from a central location. Instead, each imaging assembly 60 has its own local oscillator (not shown) and a lower frequency signal (e.g., the point rate, 120 Hz) is used to keep the image frame capture synchronized.

During image frame capture, the DSP 72 of each imaging assembly 60 also provides output to the strobe circuits 80 to control the switching of the IR LEDs 84a to 84c so that the IR LEDs are illuminated in a given sequence that is coordinated with the image frame capture sequence of each image sensor 70. In particular, in the sequence the first image frame is captured by the image sensor 70 when the IR LED 84c is fully illuminated in a high current mode and the other IR LEDs are off. The next image frame is captured when all of the IR LEDs 84a to 84c are off. Capturing these successive image frames with the IR LED 84c on and then off allows ambient light artifacts in captured image frames to be cancelled by generating difference image frames as described in U.S. Application Publication No. 2009/0278794 to McReynolds, et al., assigned to SMART Technologies ULC, the content of which is incorporated herein by reference in its entirety. The third image frame is captured by the image sensor 70 when only the IR LED 84a is on and the fourth image frame is captured by the image sensor 70 when only the IR LED 84b is on. Capturing these image frames allows pointer edges and pointer shape to be determined as described in U.S. Provisional Application No. 61/294,832 to McGibney, et al., entitled "INTERACTIVE INPUT SYSTEM AND ILLUMINATION SYSTEM THEREFOR" filed on Jan. 14, 2010, the content of which is incorporated herein by reference in its entirety. The strobe circuits 80 also control the IR LEDs 84a to 84c to inhibit blooming and to reduce the size of dark regions in captured image frames that are caused by the presence of other imaging assemblies 60 within the field of view of the image sensor 70 as will now be described.

During the image capture sequence, when each IR LED 84 is on, the IR LED floods the region of interest over the interactive surface 24 with infrared illumination. Infrared illumination that impinges on the retro-reflective bands of bezel segments 40, 42, 44 and 46 and on the retro-reflective labels 118 of the housing assemblies 100 is returned to the imaging assemblies 60. As a result, in the absence of a pointer, the image sensor 70 of each imaging assembly 60 sees a bright band having a substantially even intensity over its length together with any ambient light artifacts. When a pointer is brought into proximity with the interactive surface 24, the pointer occludes infrared illumination reflected by the retro-reflective bands of bezel segments 40, 42, 44 and 46 and/or the retro-reflective labels 118. As a result, the image sensor 70 of each imaging assembly 60 sees a dark region that interrupts the bright band 159 in captured image frames. The reflections of the illuminated retro-reflective bands of bezel segments 40, 42, 44 and 46 and the illuminated retro-reflective labels 118 appearing on the interactive surface 24 are also visible to the image sensor 70.

Figure 7A:
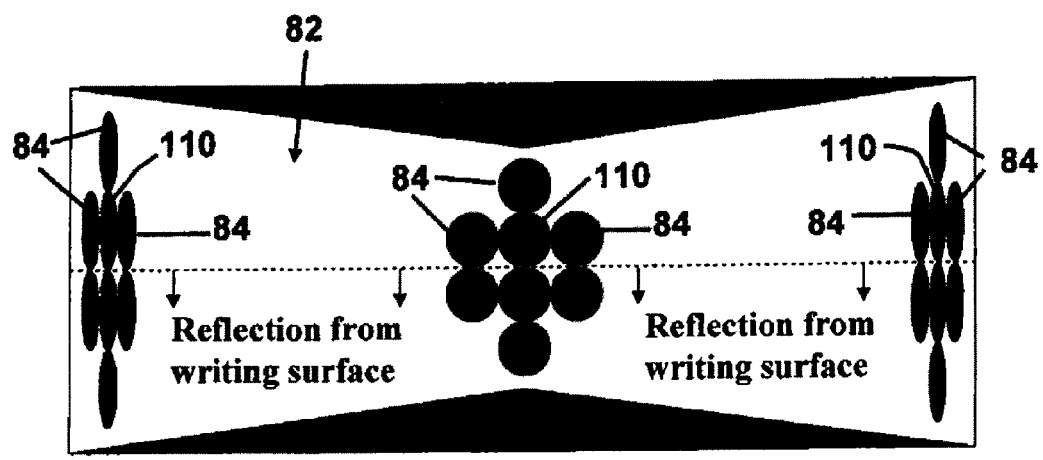
FIG. 7a is a simplified exemplary image frame captured by the imaging assembly of FIG. 3 when the IR LEDs associated with other imaging assemblies of the interactive input system are in an off state.

FIG. 7a shows an exemplary image frame captured by the image sensor 70 of one of the imaging assemblies 60 when the IR LEDs 84a to 84c associated with the other imaging assemblies 60 are off during image frame capture. As can be seen, the IR LEDs 84a to 84c and the filter 110 of the other imaging assemblies 60 appear as dark regions that interrupt the bright band 159. These dark regions can be problematic as they can be inadvertently recognized as pointers.

Figure 7B:
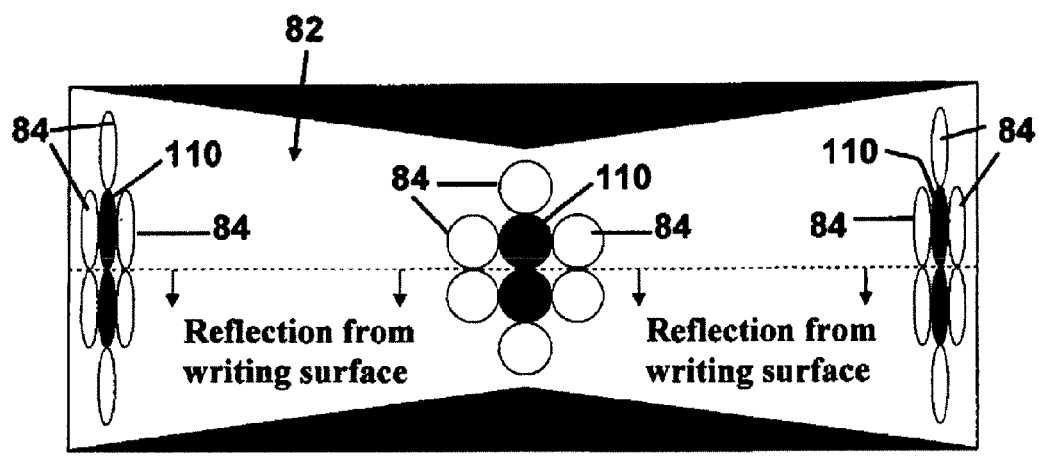
FIG. 7b is a simplified exemplary image frame captured by the imaging assembly of FIG. 3 when the IR LEDs associated with other imaging assemblies of the interactive input system are in a low current on state.

To address this problem, when the image sensor 70 of one of the imaging assemblies 60 is capturing an image frame, the strobe circuits 80 of the other imaging assemblies 60 are conditioned by the DSPs 72 to a low current mode. In the low current mode, the strobe circuits 80 control the operating power supplied to the IR LEDs 84a to 84c so that they emit infrared lighting at an intensity level that is substantially equal to the intensity of illumination reflected by the retro-reflective bands on the bezel segments 40, 42, 44 and 46 and by the retro-reflective labels 118. FIG. 7b shows an exemplary image frame captured by the image sensor 70 of one of the imaging assemblies 60 when the IR LEDs 84a to 84c associated with the other imaging assemblies 60 are operated in the low current mode. As a result, the size of each dark region is reduced. Operating the IR LEDs 84a to 84c in this manner also inhibits blooming (i.e., saturation of image sensor pixels) which can occur if the IR LEDs 84a to 84c of the other imaging assemblies 60 are fully on during image frame capture. The required levels of brightness for the IR LEDs 84a to 84c in the low current mode are related to the distance between the image sensor 70 and the opposing bezel segments 40, 42, 44, and 46. Generally, lower levels of brightness are required as the distance between the image sensor 70 and the opposing bezel segments 40, 42, 44, and 46 increases due to the light loss within the air as well as inefficient distribution of light from each IR LED towards the bezel segments 40, 42, 44, and 46.

The sequence of image frames captured by the image sensor 70 of each imaging assembly 60 is processed by the DSP 72 to identify each pointer in each image frame and to obtain pointer shape and contact information as described in above-incorporated U.S. Provisional Application Ser. No. 61/294,832 to McGibney, et al. The DSP 72 of each imaging assembly 60 in turn conveys the pointer data to the DSP 200 of the master controller 50. The DSP 200 uses the pointer data received from the DSPs 72 to calculate the position of each pointer relative to the interactive surface 24 in (x,y) coordinates using well known triangulation as described in above-incorporated U.S. Pat. No. 6,803,906 to Morrison. This pointer coordinate data along with pointer shape and pointer contact status data is conveyed to the general purpose computing device 28 allowing the image data presented on the interactive surface 24 to be updated.

Figure 8:
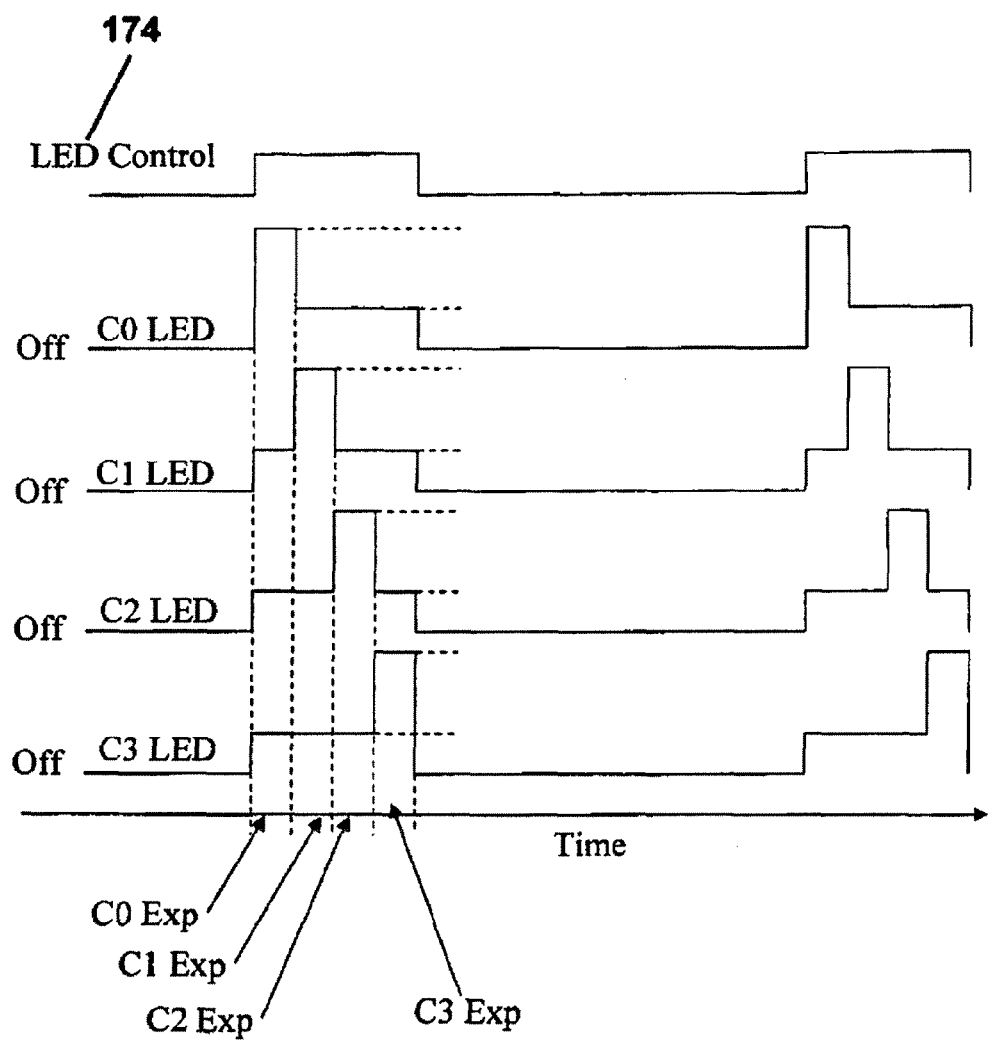
FIG. 8 is a timing diagram showing when each imaging assembly of the interactive input system of FIG. 1 has its respective illumination sources active in order to capture illuminated image frames.

The manner by which each strobe circuit 80 controls its associated IR LEDs 84a to 84c will now be described with particular reference to FIGS. 5 and 8. The strobe circuit 80 employs two control mechanisms for controlling the flow of current through each of its respective IR LEDs. The first mechanism that is employed to control the flow of current through the IR LEDs 84a to 84c is via the DSP 72 which sets the voltage output, Vset, of the digital-to-analog converter 84 (DAC) by providing appropriate output on the serial data input line 152 and corresponding clock signal 154. The operational amplifier 156 and the transistor 158 form a voltage follower circuit such that node VLED 94 is equal to Vset. In this configuration, the "on" resistance of the transistor 158 is automatically adjusted in order to make the current passing through each IR LED constant during operation. The voltage Vset in this embodiment is equal to 1 Volt.

The second mechanism to control the flow of current through the IR LEDs 84a to 84c is represented by the components surrounded by the dotted lines which form a low/high current enable circuit. Referring to FIG. 8, when the LED control line 174 is high, the IR LEDs 84a to 84c are active and when the LED control line 174 is low the IR LEDs are inactive. During a high LED control line 174 condition, the strobe circuits 80 are conditioned to operate the IR LEDs 84a to 84c in the low current mode if the imaging assembly 60 is not capturing an image frame. The imaging assemblies 60 capture images in a round-robin fashion by activating the snapshot line 78 during which time, depending on the position in the image frame capture sequence, the appropriate IR LED 84 is conditioned to the high current state in order to fully illuminate.

The current passing through each IR LED is approximated by the following equation:

$$I_{LEDH} \approx \frac{R4 \cdot R5}{R4 + R5} \cdot Vset$$

for high current operation which can be further approximated by the following equation:

$$I_{LEDH} \approx \frac{Vset}{R4}$$

and for low current operation can be further approximated by the following equation:

$$I_{LEDL} \approx \frac{Vset}{R5}$$

Capacitor 166 stores the charge for the respective IR LED 84 when it is turned on further maintaining constant illumination. Since VDDLED 82 is used for multiple imaging assemblies 60, the Schottky diode 164 prevents charge from escaping from one imaging assembly 60 to other imaging assemblies 60. The value of VDDLED 82 is dependant on the size of capacitor 166, the forward voltage drop of the IR LED, the voltage between the drain and source of the transistors 158, 170, and 172, the total charge to pass through the IR LED (e.g., the integral of the IR LED current over time), and the source impedance of the VDDLED 82 supply, etc. In this embodiment, VDDLED 82 is equal to 12 volts.

The low current enable line 175 is controlled via the LED control line 174 of the DSP 72. When the signal on the LED control line 174 is high, the transistor 172 is active allowing current to flow through the low current circuit pathway via the resistor R5. This produces current levels of approximately 13 mA through the IR LED for a Vset of 1 volt. A current level of 13 mA produces between approximately 160 and 320 milliwatts per steradian (mW/sr) of infrared illumination from the IR LED. The high current enable line 178 is controlled via the LED out line of the image sensor 70. When the signal on the high current line 178 is high, the transistor 170 is active allowing current to flow through the high current circuit pathway via the resistor R4. The image sensor 70 times the signal provided on the LED out line that is applied to the high current enable line 178 to correspond with the integration period for a fully illuminated image frame, in this embodiment 125 μsec, where image data is captured. During this period, the current level passing through the IR LED is approximately 990 mA for a Vset of 1 volt. A current level of 990 mA produces between approximately 8000 and 16,000 mW/sr.

Although in the embodiment described above, the IR LEDs 84a to 84c are in a low current mode during the time period that other imaging assemblies are acquiring image frames, one of ordinary skill in the art will appreciate that the duration of the low current mode may be reduced for imaging assemblies 60 if they are not within the field of view of the imaging assembly 60 that is currently capturing image data.

Although in the embodiment described above, feedback is not used to control the illumination of the IR LEDs 84a to 84c, one of ordinary skill in the art will appreciate that feedback may be employed to allow the illumination of the IR LEDs 84a to 84c more closely to match the illumination reflected by the retro-reflective bands. In order to do so, the imaging data captured from the current image assembly 60 can be used to adjust the brightness (e.g., the current) of the opposing illumination sources. Such a feedback system may be advantageous to reduce the complexity of image processing algorithms.

Those of skill in the art will appreciate that other control mechanisms and circuit designs may be employed to control the IR LEDs.

Although the embodiment described herein has a central, synchronized system for coordinating imaging assembly exposures, one of the skill in the art will appreciate that time stamping and interpolation of the images is possible for asynchronous systems.

One of skill in the art will also appreciate that calibration may be required in order to match the brightness of the IR LEDs to the illumination reflected by the retro-reflective bands and that calibration parameters may differ from imaging assembly to imaging assembly. One of skill in the art will appreciate that calibration may be performed manually or automatically using feedback from the opposing imaging assemblies. One of skill the art will also appreciate that the brightness of the IR LEDs do not precisely have to match the illumination reflected by the retro-reflective bands.

Although the embodiments described herein uses three IR LEDs per imaging assembly, those of skill in the art would know that other numbers of illumination sources may be used. Although in the embodiments described above, the LEDs 84a to 84c emit infrared radiation, in other embodiments, visible or other forms of light radiation may alternatively be emitted.

Although in embodiments described above, the frame rate of the imaging assemblies is 960 Hz, those of skill in the art will appreciate that the interactive input system is not limited to these frequencies. For example, the image sensors of the imaging assemblies may be capable of very high frame rates, such as those on the order of $10^6$ frames per second, or very low frame rates, such as 30 frames per second.

In embodiments described above, the IR LEDs are cycled at a rate that is half of the frame rate. In other embodiments, the IR LEDs may alternatively be cycled at other rates, such as ⅓, ¼ or ¹⁄₁₀₀ of the frame rate, for example. In systems using IR LEDs that cycle at rates less than that of the frame rate, such as ¹⁄₁₀₀ the frame rate, any image frames captured while the IR LEDs are off can be used for analyzing the light intensity of any active pen tools present to identify the pointers and other information such as tip pressure, while image frames captured while the IR LEDs are on can be used for ambient light removal and pointer triangulating.

Although the embodiments described herein employ a retro-reflective bezel, one of skill in the art will appreciate that the IR illumination sources need only match the background, even though the background may not be retro-reflective.

In the embodiments described above, the imaging assemblies 60 are described as communicating with the master controller 50 via a DSS communications link. Other communications links such as a parallel bus, a universal serial bus (USB), an Ethernet connection or other suitable wired connection may however be employed. Alternatively, the imaging assemblies 22 may communicate with the master controller 50 over a wireless connection using a suitable wireless protocol such as for example Bluetooth, WiFi, ZigBee, ANT, IEEE 802.15.4, Z-Wave etc. Also, the master controller 50 is described as communicating with the general purpose computing device 28 via a USB cable 30. Alternatively, the master controller 50 may communicate with the general purpose computing device 28 over another wired connection such as for example, a parallel bus, an RS-232 connection, an Ethernet connection etc. or may communicate with the general purpose computing device 28 over a wireless connection using a suitable wireless protocol such as for example Bluetooth, WiFi, ZigBee, ANT, IEEE 802.15.4, Z-Wave etc.

In the embodiments described above, a short-throw projector is used to project an image onto the interactive surface 24. As will be appreciated other front projection devices or alternatively a rear projection device may be used to project the image onto the interactive surface 24. Rather than being supported on a wall surface, the interactive board 22 may be supported on an upstanding frame or other suitable support. Still alternatively, the interactive board 22 may engage a display device such as for example a plasma television, a liquid crystal display (LCD) device etc. that presents an image visible through the interactive surface 24.

Although a specific processing configuration has been described, those of skill in the art will appreciate that alternative processing configurations may be employed. For example, one of the imaging assemblies may take on the master controller role. Alternatively, the general purpose computing device may take on the master controller role.

Although various embodiments have been described, those of skill in the art will appreciate that other variations and modifications may be made with departing from the spirit and scope thereof as defined by the appended claims.

What is claimed is:

1. An interactive input system comprising:
    an illumination source associated with each of a plurality of imaging assemblies and configured to emit radiation into a region of interest;
    the plurality of imaging assemblies configured to capture image frames of said region of interest, at least one illumination source being in the field of view of at least one of the plurality of imaging assemblies; and controller structure communicating with each illumination source, said controller structure configured to control the intensity of radiation emitted by each illumination source during image frame capture, wherein during image frame capture by one of the plurality of imaging assemblies, said controller structure causes the intensity of emitted radiation by its associated illumination source to be at a first illumination level, and wherein during image frame capture by another of said plurality of imaging assemblies, said controller structure causes the intensity of emitted radiation by the illumination source associated with said one of the plurality of imaging assemblies to be at a second, non-zero, lower illumination level.

2. The interactive input system of claim 1 wherein the intensity of emitted radiation at said second lower illumination level approximates backlight illumination provided to said region of interest.

3. The interactive input system of claim 2 comprising:
at least one illumination source adjacent each imaging assembly; and
a controller for each illumination source.

4. The interactive input system of claim 3, wherein each controller is responsive to its associated imaging assembly during image frame capture thereby to illuminate at said first illumination level the associated illumination source, and is responsive to its associated imaging assembly during image frame capture by said another of the plurality of imaging assemblies to illuminate its associated illumination source at the second, lower illumination level.

5. The interactive input system of claim 4 comprising a plurality of illumination sources associated with each imaging assembly.

6. The interactive input system of claim 4, wherein each controller is responsive to an image sensor of said associated imaging assembly during image frame capture thereby, and is responsive to a processor of said associated imaging assembly when illuminating the associated at least one illumination source at said second, lower illumination level.

7. The interactive input system of claim 2, wherein said region of interest is substantially rectangular, and wherein the imaging assemblies are positioned adjacent at least two corners of said region of interest.

8. The interactive input system of claim 7 further comprising a reflective bezel at least partially surrounding the region of interest.

9. The interactive input system of claim 8 wherein said reflective bezel is retro-reflective.

10. The interactive input system of claim 9 wherein an imaging assembly is positioned adjacent each corner of said region of interest.

11. The interactive input system of claim 9, further comprising a plurality of illumination sources associated with each imaging assembly.

12. The interactive input system of claim 11, wherein said illumination sources comprise infrared sources.

13. The interactive input system of claim 8, wherein the intensity of emitted radiation at said second lower illumination level corresponds to backlight illumination provided to said region of interest.

14. The interactive input system of claim 13 further comprising a controller for each illumination source, and wherein each controller is responsive to its associated imaging assembly during image frame capture thereby to illuminate at said first illumination level the associated at least one illumination source, and is responsive to its associated imaging assembly during image frame capture by said another of the plurality of imaging assemblies to illuminate the associated at least one illumination source at said second lower illumination level.

15. The interactive input system of claim 14, further comprising a plurality of illumination sources associated with each imaging assembly.

16. The interactive input system of claim 14 wherein each controller is responsive to an image sensor of the associated imaging assembly during image frame capture thereby, and is responsive to a processor of the associated imaging assembly when illuminating the associated illumination source at a reduced level.

17. A method of controlling image capture in an interactive input system, the method comprising:
associating an illumination source with each of a plurality of imaging assemblies;
causing at least one illumination source to emit radiation into a region of interest;
causing the plurality of imaging assemblies to capture image frames of said region of interest, at least one illumination source being in the field of view of at least one imaging assembly and appearing in captured image frames; and
controlling the intensity of radiation emitted by each illumination source during image frame capture by its associated imaging assembly,
wherein during image frame capture by one of the plurality of imaging assemblies, the intensity of emitted radiation by its associated illumination source is controlled to be at a first illumination level, and
wherein during image frame capture by another of said plurality of imaging assemblies, the intensity of emitted radiation by the illumination source associated with said one of the plurality of imaging assemblies is controlled to be at a second, non-zero, lower illumination level.

18. The method of claim 17, wherein the second lower illumination level substantially matches backlight illumination provided to said region of interest.

19. An interactive input system comprising:
a plurality of imaging assemblies configured to capture image frames of a region of interest from different vantages, said region of interest being at least partially surrounded by a reflective bezel;
at least one illumination source associated with each imaging assembly and configured to emit radiation into said region of interest; and
a controller for each at least one illumination source, each controller configured to cause its associated at least one illumination source to emit radiation into said region of interest at a first intensity level during image frame capture by its associated imaging assembly and configured to reduce the intensity of radiation emitted by its associated at least one illumination source from the first illumination level to a second non-zero lower intensity level during image frame capture by other imaging assemblies so that the intensity of emitted radiation at said second lower illumination level substantially matches the intensity of illumination reflected by said bezel.

20. The interactive input system of claim 19 wherein said region of interest is generally rectangular, and imaging assemblies are positioned adjacent at least two corners of said region of interest.

21. The interactive input system of claim 19 wherein said reflective bezel is retro-reflective.

22. The interactive input system of claim 20 wherein an imaging assembly is positioned adjacent each corner of said region of interest.

23. The interactive input system of claim 19 comprising a plurality of illumination sources associated with each imaging assembly.

24. The interactive input system of claim 23 wherein said illumination sources are infrared sources.

* * * * *